(12) United States Patent
Ghodbane et al.

(10) Patent No.: US 6,405,793 B1
(45) Date of Patent: Jun. 18, 2002

(54) SECONDARY LOOP SYSTEM FOR PASSENGER COMPARTMENT HEATING AND COOLING

(75) Inventors: Mahmoud Ghodbane, Lockport; James Allen Baker, Williamsville, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/563,385

(22) Filed: May 3, 2000

(51) Int. Cl.[7] .................. F25B 29/00; B60H 1/00; B60H 1/32
(52) U.S. Cl. .................. 165/203; 165/42; 165/43; 165/140; 62/434; 62/435; 62/244; 62/243; 237/12.3 B
(58) Field of Search .................. 165/203, 43, 42, 165/140; 62/333, 334, 434, 435, 436, 185, 244, 243; 237/12.3 B

(56) References Cited

U.S. PATENT DOCUMENTS

| | | | | |
|---|---|---|---|---|
| 2,774,222 A | * | 12/1956 | Jacobs et al. | 165/43 |
| 2,787,129 A | * | 4/1957 | Evans | 165/43 |
| 2,884,768 A | * | 5/1959 | Gould | 165/43 |
| 3,753,462 A | * | 8/1973 | Burger | 165/42 |
| 4,724,898 A | * | 2/1988 | Stolz et al. | 165/43 |
| 5,138,851 A | * | 8/1992 | Mardikian | 62/434 |
| 5,265,437 A | * | 11/1993 | Saperstein et al. | 62/435 |
| 5,582,236 A | * | 12/1996 | Eike et al. | 237/12.3 B |
| 5,730,089 A | * | 3/1998 | Morikawa et al. | 237/12.3 B |
| 5,884,696 A | * | 3/1999 | Loup | 165/43 |
| 5,898,995 A | * | 5/1999 | Ghodbane | 29/890.03 |
| 5,904,052 A | * | 5/1999 | Inoue et al. | 165/43 |
| 5,910,157 A | * | 6/1999 | Noda | 62/133 |

FOREIGN PATENT DOCUMENTS

| EP | 0488553 | * | 6/1992 | 165/42 |
|---|---|---|---|---|

\* cited by examiner

*Primary Examiner*—John K. Ford
(74) *Attorney, Agent, or Firm*—Patrick M. Griffin

(57) ABSTRACT

A vehicle climate control system having a separate control for first and second separate areas of the vehicle. The climate control system includes a three-fluid heat exchanger having a first path with a first inlet and first outlet, and a second path with a second inlet and second outlet. The first path communicates refrigerant between the first inlet and first outlet and the second path communicates coolant between the second inlet and second outlet without the refrigerant and the coolant being mixed. A primary refrigerant loop is interconnected by a refrigerant line with the refrigerant line being connected to the inlet and outlet of the first path. A secondary loop is connected to the inlet and the outlet of the second path such that the coolant flows through the three-fluid heat exchanger to selectively cool or heat the second area of the vehicle by heat transfer within the three-fluid heat exchanger. A heating loop is selectively connected to the secondary loop, three-fluid heat exchanger and the vehicle engine coolant supply for supplying heat to the first and second areas of the vehicle.

3 Claims, 4 Drawing Sheets

SECONDARY LOOP SYSTEM FOR PASSENGER COMPARTMENT HEATING AND COOLING

TECHNICAL FIELD

This invention relates to the selective heating and cooling of the front and rear of a vehicle interior. More particularly, the present invention relates to a heating and cooling system that uses a three-fluid heat exchanger that joins the primary and secondary loops of the heating and cooling system. The three-fluid heat exchanger heats and cools the front of the vehicle and heats and chills the secondary loop that flows through a two fluid heat exchanger in the rear of the vehicle. The invention eliminates the typical rear evaporator and heater of traditional systems and replaces them with a less expensive two fluid heat exchanger.

BACKGROUND OF THE INVENTION

Systems for selectively heating and cooling the front and rear of a vehicle are known. Typically, the rear air conditioning portion of these systems employs a separate evaporator and refrigerant lines that are connected to the primary loop or front air conditioning system of the vehicle. Having two separate systems increases the cost of the vehicle air conditioning system because of the need for a rear evaporator, additional refrigerant lines and valves, increased refrigerant charges and additional labor costs to install the separate system. One example of a dual evaporator system is described in U.S. Pat. No. 5,910,157.

There have been attempts to eliminate the duplication of components in systems used to heat and cool the front and rear of vehicles. In U.S. Pat. No. 5,904,052, ('052) a primary refrigerant system is employed to deliver decompressed refrigerant to a brine-refrigerant heat exchanger, which cools the brine. A pump pumps the cooled brine through a front air conditioning unit and a rear air conditioning unit. The system also employs the hot coolant water of the engine to control the temperature of the air that is provided to the vehicle. There is provided a common passage portion with switching valves through which both the hot coolant water and the brine flow into the air conditioning heat exchanger. One disadvantage of the system is its complexity. The system employs a brine-refrigerant heater and the engine coolant, plus air conditioning units that are separate from the brine-refrigerant heater. Due to this arrangement, the system requires a complex array of valves and piping, to heat and cool the vehicle.

A somewhat related system is described in U.S. Pat. No. 5,138,851. In this system, there is no concern for heating and cooling the front and rear of the vehicle; however, there is an effort to cool specific areas of the vehicle by using cooled water, which circulates through tubing located in various items of the vehicle. This patent discloses a closed loop air conditioning subsystem which has a motor which drives a compressor and which refrigerant fluid is compressed. The compressed fluid is passed into a condenser where the compressed fluid is cooled by dissipating its heat to the environment and from there the compressed fluid is released through an expansion valve into an evaporator. The second main component of the invention is a subsystem where working fluid is in heat exchange relationship with the evaporator of the first system whereby the working fluid is cooled in the evaporator and is thereafter sent by a pump or fan, driven by a suitable motor, into cooling members, such as cooling coils incorporated within the seat or other items within the vehicle. The evaporator of the traditional air conditioning system has an add on feature which includes conduits that are held in close proximity to the evaporator. In this way, the fluid within the conduits can be cooled by the evaporator and then pumped to the seats, steering wheel, etc. The difficulty with this system is that there is no teaching of heating the vehicle in the front and rear and in fact there is no teaching or suggestion how to cool the vehicle in the front and rear. Furthermore, the invention requires the use of an evaporator which adds cost and a fairly inefficient heat transfer mechanism associated with the evaporator.

SUMMARY OF THE INVENTION

The present invention overcomes the above problems associated with known attempts to effectively and efficiently heat and cool the front and rear of a vehicle. The present invention provides a vehicle climate control system with a separate control for the front and rear areas of the vehicle. The climate control system includes a three-fluid heat exchanger (refrigerant, coolant solution and air) having a first path with a first inlet and first outlet, and a second path with a second inlet and second outlet. The first path is adapted to communicate refrigerant between the first inlet and first outlet. The second path is adapted to communicate coolant between the second inlet and second outlet without the refrigerant and coolant being mixed. A refrigerant type loop or primary loop is provided. This loop includes a compressor and condenser interconnected by a refrigerant line with the refrigerant line being connected to the inlet and outlet of the first path such that the refrigerant passes through the three-fluid heat exchanger. The front area of the vehicle passenger compartment is cooled by this three-fluid heat exchanger and more particularly by the use of a fan blowing air across the three-fluid heat exchanger.

A secondary loop is provided having a dual fluid heat exchanger (coolant solution and air) and a coolant line connected to the inlet and the outlet of the second path such that the coolant flows through the three-fluid heat exchanger. The dual fluid heat exchanger is typically in the rear area of the vehicle passenger compartment. The coolant is cooled as it flows through the three-fluid heat exchanger by the refrigerant flowing through the three-fluid heat exchanger adjacent the coolant. The coolant is then passed through the dual fluid heat exchanger for cooling the rear passenger area of the vehicle. The secondary loop includes a simple fluid valve for diverting coolant from the dual fluid heat exchanger to control the cooling the rear of the vehicle.

In addition to the cooling system, the climate control system of the present invention includes a heating loop having a first heating conduit and a second valve for selectively connecting the secondary loop to the engine coolant system. The heating loop includes a second heating conduit and a third valve for selectively connecting the three-fluid heat exchanger to the vehicle engine coolant system. By manipulating the valves, the vehicle can be placed in an air conditioning mode wherein the valves prevent flow of fluid from the engine, and in a heating mode for the front and rear which utilizes the engine coolant and circulates it through the three-fluid heat exchanger and the dual fluid heat exchanger to heat and cool the front and the rear. In a rear-heating mode wherein the three-fluid heat exchanger is bypassed, only the rear heat exchanger is utilized.

In this invention, a rear-mounted heater and evaporator are eliminated. Additionally, the extra refrigerant, refrigerant lines and valving are not necessary. The system provides a very compact unit wherein the air conditioning circuit is substantially maintained within the vehicle engine compartment, the three-fluid heat exchanger is a small compact unit which can save instrument panel space and the typical components in the rear of the vehicle are eliminated saving space and cost.

The invention also allows for more flexibility in the placement of the heat exchangers. The heat exchangers can be placed in various locations in the vehicle to heat or cool specific areas for passenger comfort.

BRIEF DESCRIPTION OF THE DRAWINGS

Other advantages of the present invention will be readily appreciated, as the same become better understood by reference to the following detailed description when considered in connection with the accompanying drawings wherein.

DETAILED DESCRIPTION OF THE INVENTION

Figure 1:
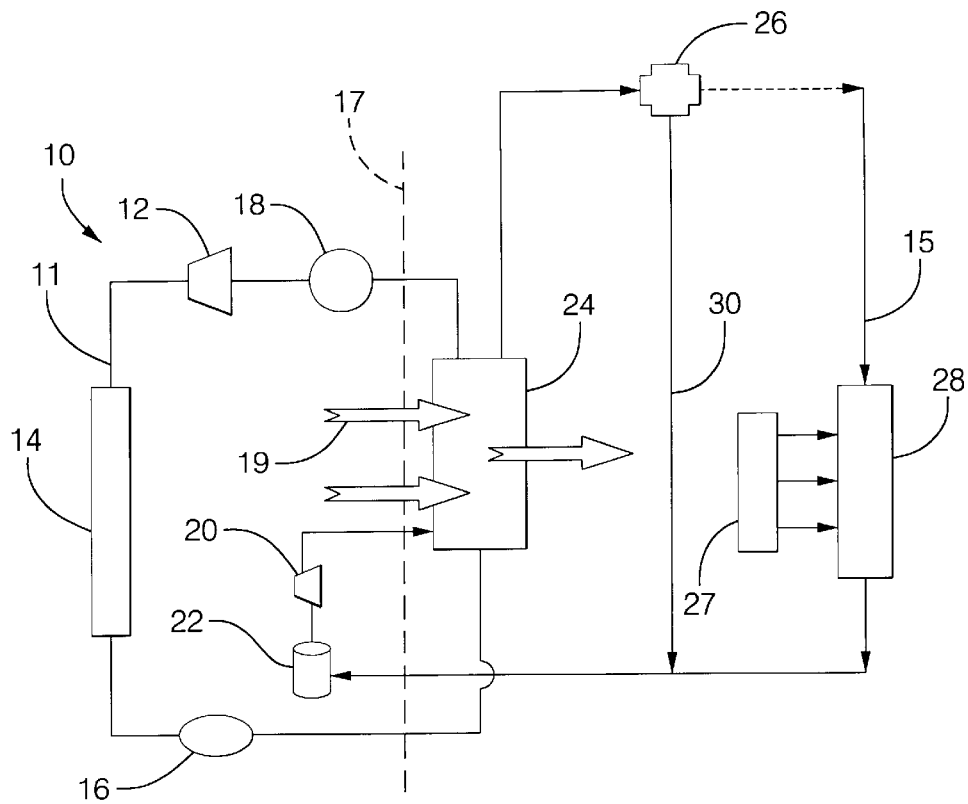
FIG. 1 is a schematic view of the climate control system of the present invention illustrating the air conditioning system of the present invention.

With reference to FIG. 1, an air conditioning system of the present invention is shown schematically at 10. The system includes a primary loop or refrigeration system 11 and a secondary loop or coolant system 15. As illustrated, the primary loop includes a compressor 12 that delivers compressed refrigerant to the condenser 14. The refrigerant then travels through an expansion device 16, through a three-fluid heat exchanger 24 into an accumulator-dehydrator 18 and back to the compressor 12. The three-fluid heat exchanger 24 will be discussed in greater detail below. The secondary loop 15 includes a pump 20 connected to a reservoir 22 which pumps a coolant, such as water-glycol, around the loop 15. The coolant is pumped through the three-fluid heat exchanger 24 and depending upon the three-way valve 26 through a heat exchanger 28 and then back to the reservoir 22 and pump 20. The three-way valve 26 is a bypass that either allows the coolant to pass through the heat exchanger 28 or merely circulate through the bypass circuit 30.

When air conditioning is needed in the rear of the vehicle the three-way valve 26 is turned to allow that coolant to pass through the heat exchanger 28. In the preferred embodiment, a fan is provided adjacent the heat exchanger 28 to blow the cooled air into the rear compartment. The fan 27, three-way valve 26 and the heat exchanger 28 define the rear mounted passenger compartment-cooling unit. In this way, the rear compartment can be cooled without the need for traditional expensive valving, rear evaporator, expansion device, etc.

The loop 11 would preferably be substantially contained within the engine compartment of the vehicle. The dashed line 17 schematically illustrates the front of the instrument panel of the vehicle with air 19 being drawn in from the outside and/or passenger cabin and forced over the three-fluid heat exchanger 24.

Figure 7:
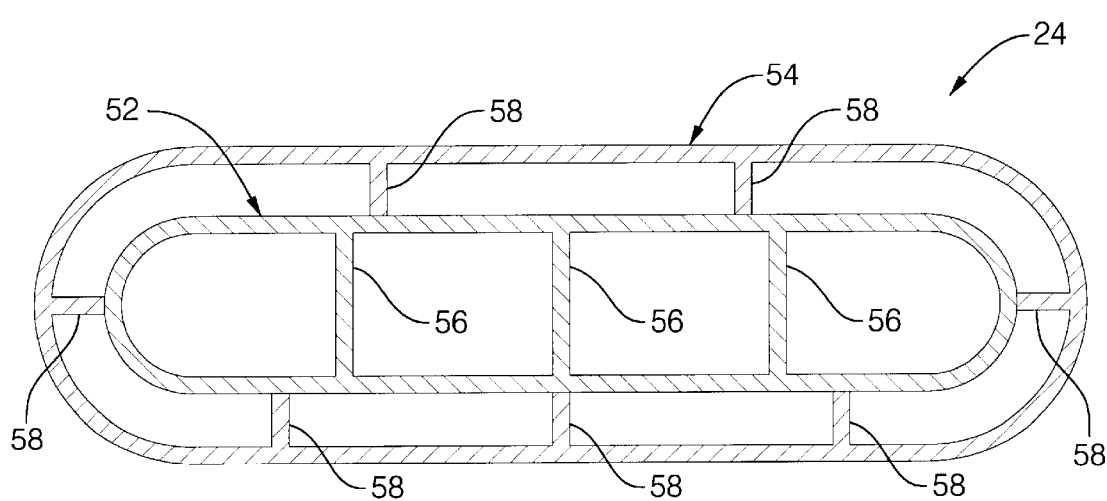
FIG. 7 is a cross-sectional view of a composite three-fluid heat exchanger.

The coolant being pumped through the loop 15 is cooled as it passes through the three-fluid heat exchanger 24. The three-fluid heat exchanger 24 receives the refrigerant from the loop 11 and passes it through the inner tubes shown generally at 52 shown in FIG. 7. The coolant passes through the outer tubes 54. The tubes 52 and 54 allow two different heat exchange media to be in thermal contact without physical mixing. The inner tube 52 is an integral flat hollow tube with interior passages defined by interior webs 56. The outer tube 54 is relatively thicker and wider than the inner tube 52 and provides a plurality of integral spacer webs 58 on its inner surface. The edges of the spacer webs 58 terminate on an envelope that just matches the outer surface of the inner tube 52. This creates a jacket of substantially constant space surrounding the outer surface of the inner tube 52, discrete from the interior of the tube 52. It will be understood by those of ordinary skill in the art, that heat exchanger 24 includes fins, not shown, for effective heat transfer with the third fluid, air, being blown over the fins. The three-fluid heat exchanger is more fully described in U.S. Pat. No. 5,898,995, which is incorporated hereby by reference.

Figure 2:
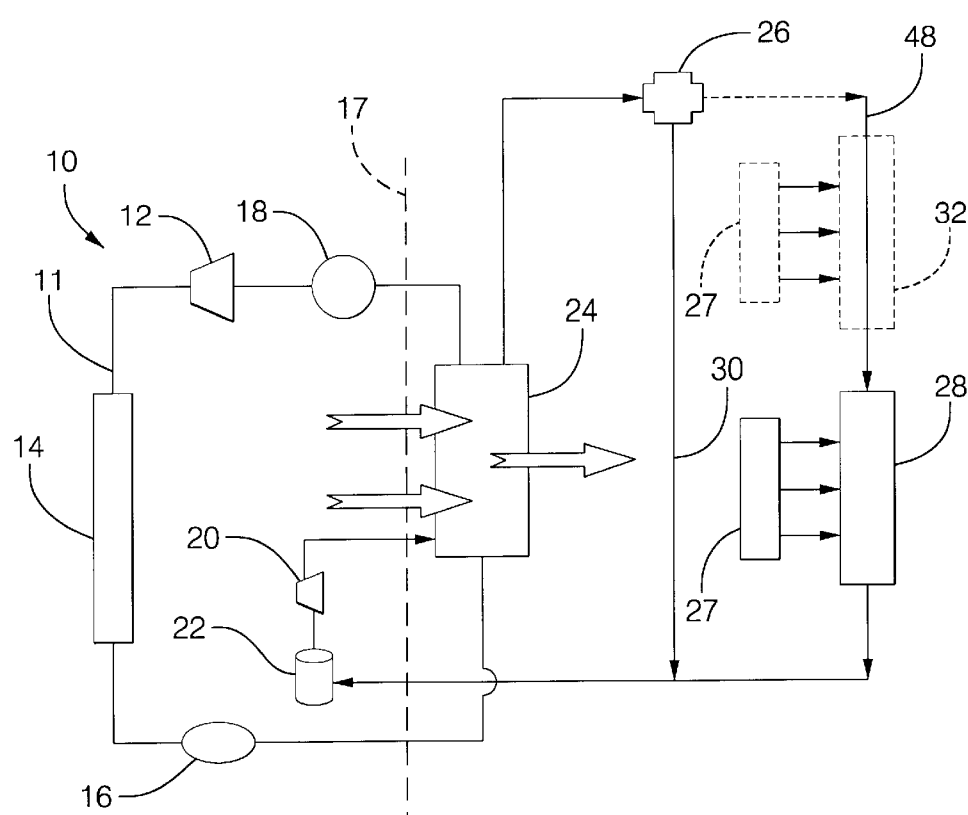
FIG. 2 is a schematic view similar to FIG. 1 illustrating the use of a second dual fluid heat exchanger in series.
Figure 3:
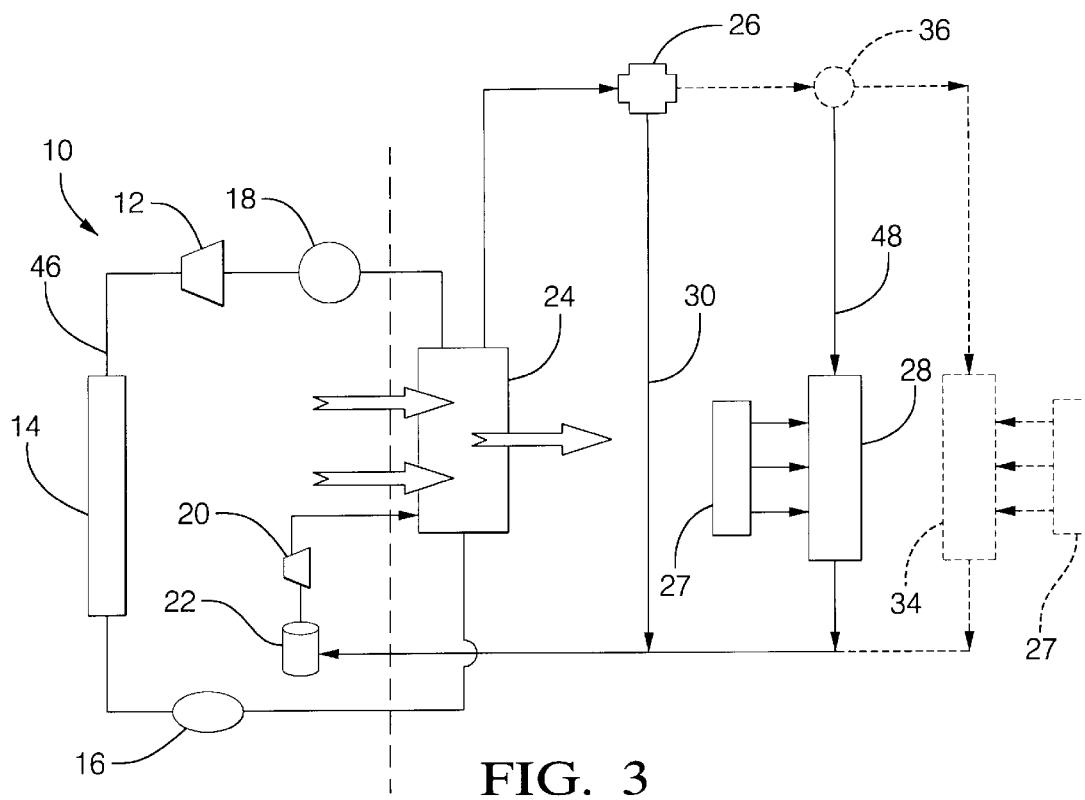
FIG. 3 is a schematic view of the climate control system of the present invention illustrating the use of two dual fluid heat exchangers in parallel.

With reference to FIG. 2, a second fluid heat exchanger 32 is added to the air conditioning system of FIG. 1. As illustrated, the second fluid heat exchanger 32 is in series with the heat exchanger 28. It should be understood that additional heat exchangers could be added in series or parallel with additional controls to perform numerous cooling duties. With reference to FIG. 3, an example of an air conditioning system with parallel heat exchangers is illustrated. In this view, a second heat exchanger 34 has been added in parallel. A valve 36 has been provided to allow selection between heat exchangers 28 and 34. By selecting heat exchanger 28, the coolant flow is directed to path or conduit 48 and heat exchanger 34 is bypassed. By selecting both and actuating valve 36 accordingly, both heat exchangers 28 and 34 are used. It should be appreciated that additional heat exchangers could be added in parallel and in series to the heat exchangers 28 and 34.

Figure 4:
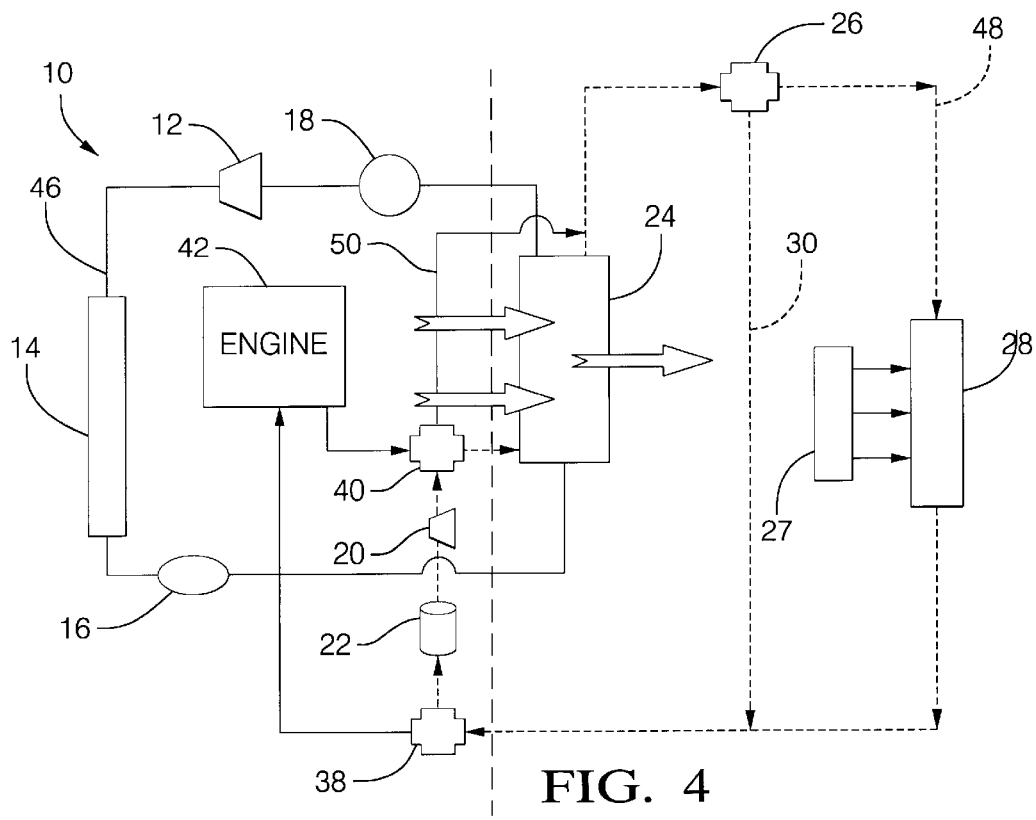
FIG. 4 is a schematic view of the climate control system of the present invention illustrating the heating loop and the air conditioning operation in conjunction with the heating loop.

With reference to FIG. 4, a schematic showing the integration of the engine coolant as the coolant source is illustrated. As will be appreciated, in this embodiment, both heating and air conditioning are available. As illustrated, like features from the previous embodiments of FIGS. 1 through 3 are numbered the same and the flow path of the secondary circuit is shown in dashed lines and the paths that are closed in the secondary circuit are in solid lines. The flow path of the primary circuit is shown in solid lines.

The air conditioning and heating circuit includes two additional three-way valves 38 and 40 to properly direct the coolant flow. With reference to FIG. 4, the air conditioning mode is illustrated. In this mode, the three-way valve 38 is opened to feed reservoir 22 and three-way valve 40 is opened to supply coolant to the three-fluid heat exchanger 24 from pump 20. The three-way valves 38 and 40 close off the flow of coolant to the engine 42 and flow line 50, respectively. In this way, the system works in the same manner as the system of FIGS. 1 through 3. Coolant is pumped by pump 20 from reservoir 22 through the three-way valve 40 through the three-fluid heat exchanger 24 and through either lines 30 or 48 depending upon the position of valve 26. The coolant is chilled as it passes through the three-fluid heat exchanger 24 by the refrigerant that is also passing through the heat exchanger 24.

Figure 5:
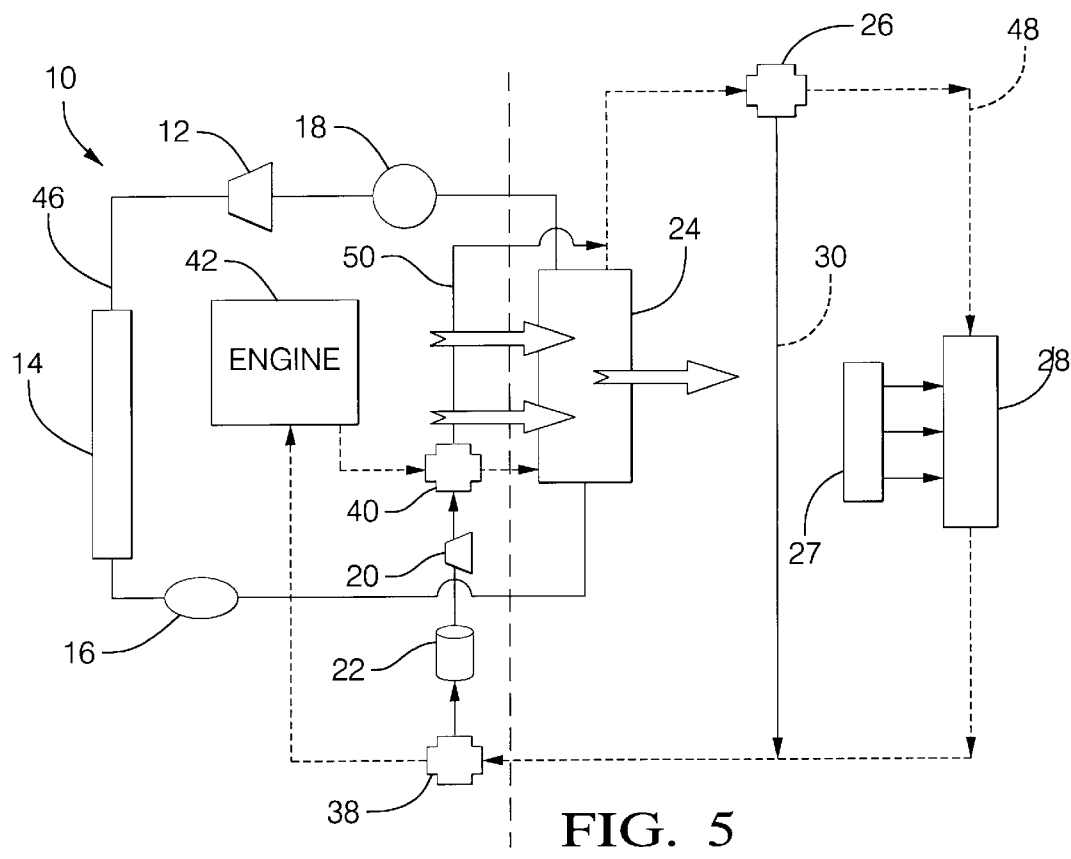
FIG. 5 is a schematic view of the climate control system of the present invention illustrating the heating mode of the present invention heating both the front and rear of the vehicle.

With reference to FIG. 5, the front and rear-heating mode is illustrated. In this mode, the engine coolant is used to heat the front and rear of the vehicle. The engine 42 supplies coolant to the three-fluid heat exchanger 24 through three-way valve 40. The air 19 blowing over the heat exchanger 24 heats the front of the vehicle. The coolant also travels through the secondary circuit 48 and through the heat exchanger 28 to heat the rear of the vehicle. Alternatively, the valve 26 can be switched to divert coolant from the heat exchanger 28 and only heat the front of the vehicle. The coolant completes the loop through valve 38 and returns to the engine 42. The coolant in this mode doesn't travel to the reservoir 22 or pump 20.

Figure 6:
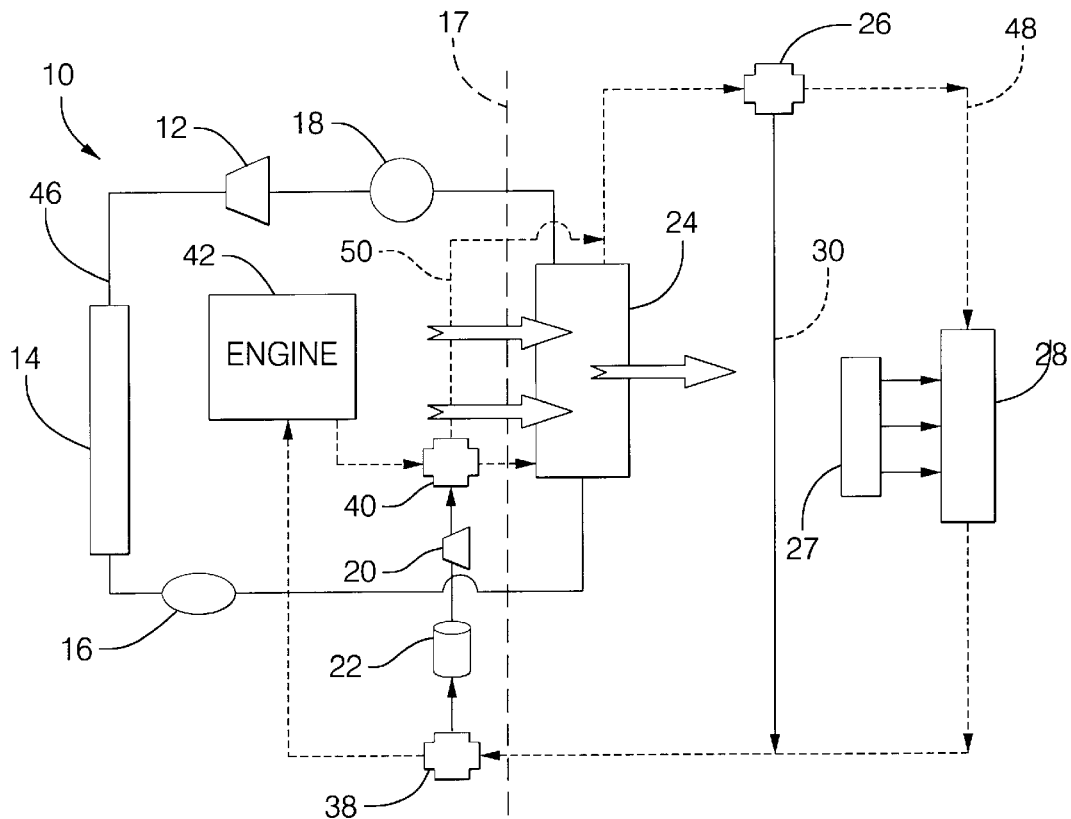
FIG. 6 is a schematic view of the climate control system of the present invention illustrating the heating mode with rear heating only.

With reference to FIG. 6, the rear only heating mode is illustrated. In this mode, the three-fluid heat exchanger 24 is bypassed and the engine coolant is directed to the heat exchanger 28 and back to the engine 42. In this mode, there is no heat being delivered to the front of the vehicle because heat exchanger 24 is bypassed. The valve 40 is open to allow flow through line 50 and not from pump 20 or to heat exchanger 24. Line 50 delivers coolant to line 48 and with valve 26 switched, the coolant flows through heat exchanger 28. Upon leaving the heat exchanger 28 the coolant is returned to the engine 42 through valve 38. The bypass line 30 is closed to allow the coolant to flow through heat exchanger 28.

The invention has been described in an illustrative manner, and it is to be understood that the terminology, which has been used, is intended to be in the nature of words of description rather than of limitation.

Obviously, many modifications and variations of the present invention are possible in light of the above teachings. It is therefore to be understood that within the scope of the appended claims, wherein reference numerals are merely for convenience and are not to be in any way limiting, the invention may be practiced otherwise and as specifically described.

What is claimed is:

1. A climate control system with a separate control for front and rear areas of a passenger compartment of a vehicle, comprising:

a three-fluid heat exchanger having a first path with a first inlet and first outlet, and a second path with a second inlet and second outlet, said first path being adapted to communicate refrigerant between the first inlet and first outlet and the second path being adapted to communicate coolant between the second inlet and second outlet without the refrigerant and the coolant being mixed;

a primary loop having at least a compressor and a condenser interconnected by a refrigerant line with the refrigerant line being connected to the inlet and outlet of the first path such that the refrigerant passes through the three-fluid heat exchanger, said front area being cooled by said three-fluid heat exchanger;

a secondary loop having a dual fluid heat exchanger and a coolant line, the coolant line being coupled to the inlet and the outlet of the second path such that the coolant flows through the three-fluid heat exchanger, the coolant being cooled as it flows through the three-fluid heat exchanger by the refrigerant flowing through the three heat exchanger adjacent said coolant, said cooled coolant passing through said dual fluid heat exchanger for cooling said rear area of said vehicle;

a pump within the secondary loop for pumping the coolant through the secondary loop;

a first three way valve within the secondary loop prior to the pump for selectively connecting the secondary loop to the engine coolant system;

a second three way valve within the secondary loop between the pump and the three fluid heat exchanger for selectively connecting the three fluid heat exchanger to the engine coolant system, wherein the second three way valve is adapted to provide coolant from the engine coolant system to the secondary loop and the first three way valve is adapted to return coolant from the secondary loop to the engine coolant system to heat at least one of the front and rear of the passenger compartment.

2. The climate control system of claim 1, wherein said secondary loop includes a reservoir for containing coolant.

3. The climate control system of claim 1, further including a first fan for blowing over said three-fluid heat exchanger such that said three-fluid heat exchanger includes refrigerant, coolant and air and a second fan for blowing over said dual fluid heat exchanger such that said dual fluid heat exchanger includes air and coolant.

\* \* \* \* \*